Aug. 9, 1960
F. A. KROHM
2,948,011
WINDSHIELD WIPER BLADE ASSEMBLY
Filed Feb. 8, 1957
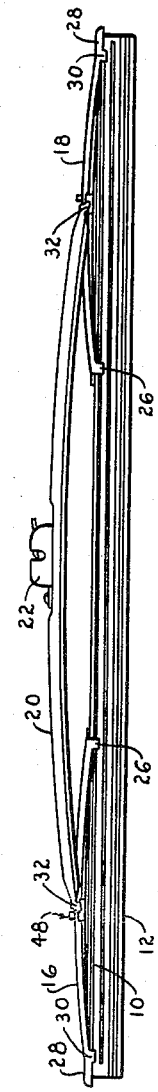
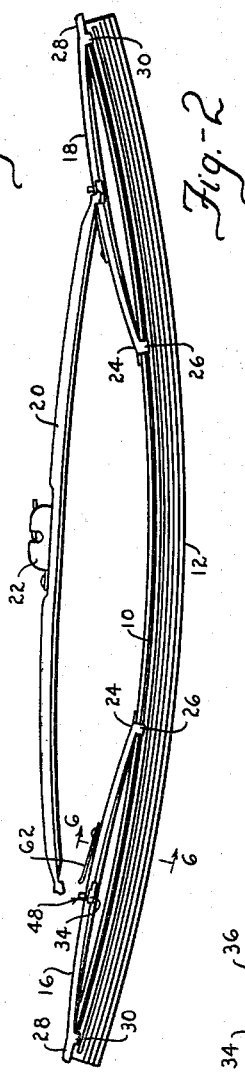
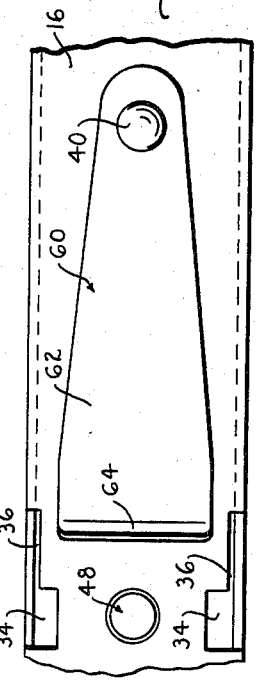
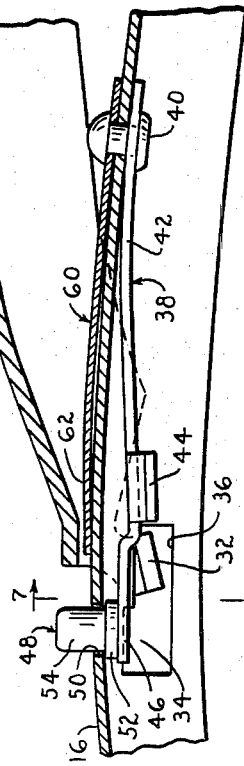
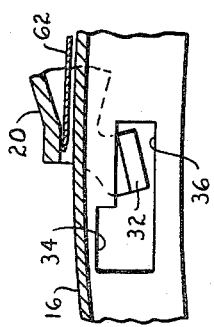
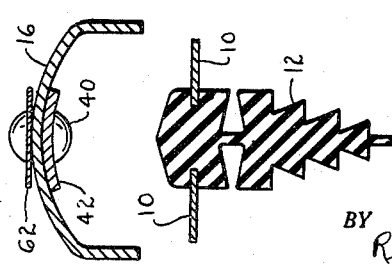
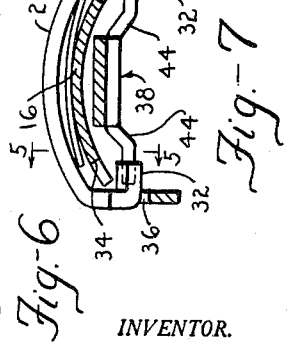
INVENTOR.
FRED A. KROHM
BY Redrow & Recktenwald
ATTORNEYS United States Patent Office 2,948,011
Patented Aug. 9, 1960

2,948,011

WINDSHIELD WIPER BLADE ASSEMBLY

Fred A. Krohm, Hobart, Ind., assignor to Productive Inventions, Inc., a corporation of Indiana Filed Feb. 8, 1957, Ser. No. 639,015

12 Claims. (Cl. 15—250.42)

This invention relates generally to windshield wipers and more particularly to a substantially noise-free wiper which will wipe a windshield having curved or flat surfaces or combinations of these surfaces.

The wiper may be constructed in various ways, but as herein shown comprises a blade assembly and a pressure-distributing device operatively connected to the blade assembly. The blade assembly or unit includes a resilient wiping element and a resiliently flexible support detachably connected to the element. The pressure device or unit preferably includes a pair of secondary yokes having their ends connected to the blade at longitudinally spaced points, a bridge or primary yoke having its ends connected to the secondary yokes, and a connector carried by the bridge for attachment with a wiper arm.

More particularly, the resiliently flexible support of the blade assembly in the illustrated embodiment is formed in such a way as to be seated in nested relation with respect to the resilient wiping blade and projects a short distance from each side laterally outwardly throughout the length of the blade. A secondary yoke slidably receives each of the extremities of the blade for applying pressure thereto and due to the construction of the secondary yokes one end thereof engages with one end of the support to provide abutment means or stops predetermining the extent of the relative sliding movement between the pressure device and blade assembly.

According to the prior art, the bridge is removably connected at each end thereof with the medial portion of the secondary yokes such that in normal operation a clicking noise may be developed between the metal-to-metal contact of the bridge and the secondary yokes that sometimes may prove to be annoying to the driver of the vehicle. The rattle between the bridge and the secondary yokes not only creates wear therebetween but also creates an amount of looseness that results in decreasing the effective pressure being transmitted to the blade from the arm.

It is, therefore, a principal object of this invention to provide an improved wiper blade assembly that will overcome the above-noted disadvantages of the prior art.

A specific object of the invention is to provide means for resiliently supporting or mounting the ends of the bridge on the secondary yokes for the dual purpose of yieldably urging the secondary yokes in a direction toward a windshield and reducing noise between the yokes and bridge during operation of the wiper back and forth across the windshield.

A further object of the invention is to provide an organization of the kind above described in which the ends of the secondary yokes find resilient support on the resilient wiping element for yieldably urging the blade assembly toward a windshield and for decreasing the area of metal-to-metal contact between the secondary yokes and blade assembly and thereby reducing noise during operation of the wiper.

A further object of the invention is to provide improved snap connection means for detachably connecting the bridge to the secondary yokes. More specifically in this respect, provision is made whereby to facilitate or expedite manual operation of the connection means to disconnect the bridge from the secondary yokes.

An important object of the invention is to provide a wiper in which the components thereof are so designed and constructed that the pressure device can only be operatively connected or disconnected with respect to the blade assembly by moving the latter to an abnormal condition. More particularly in this regard, the arrangement is preferably such that the blade assembly has to be bent to an abnormal curved condition before the bridge can be attached to the connection means on the secondary yokes.

Other objects and advantages of the invention will become apparent after the description hereinafter set forth is considered in conjunction with the drawings annexed hereto.

In the drawings:

Figure 1 is an elevational side view of the wiper;

Figure 2 is also an elevational side view exemplifying one procedure of attaching the pressure device to the blade assembly;

Figure 3 is an enlarged partial side view of the pressure device illustrating details of the connection between the bridge and a secondary yoke;

Figure 4 is an enlarged partial top view showing the relationship of the broad leaf spring mounted on the secondary yoke with the free end positioned in close proximity to the juncture of the bridge and the secondary yoke;

Figure 5 is an enlarged sectional view taken on the line 5—5 of Figure 7 showing the manner in which the ends of the bridge are located in openings provided in the secondary yokes with the spring member sandwiched therebetween;

Figure 6 is a cross-sectional view taken on the line 6—6 of Figure 2; and

Figure 7 is a cross-sectional view taken on the line 7—7 of Figure 3 showing details of one of the connections between the bridge and a secondary yoke.

As exemplified in Figures 1 and 2 of the drawings, the blade assembly includes a resiliently flexible support 10 engaged with a resilient wiper element 12 and may be of the type shown in the copending application Serial No. 609,631 of J. W. Anderson, filed September 13, 1956, or may be of the type shown in my copending application Serial No. 334,147, filed January 30, 1953, now Patent No. 2,782,442. The support is elongate and of uniform thickness and having a relatively greater dimension for its width, such as to permit flexure of the support in the direction of the thickness of the support, but not in the direction of its width. The support 10 engages with the wiper element 12 in such a way as to add stiffness thereto widthwise of the support for a later to be described purpose.

The pressure-distributing device may comprise relatively movable parts and as shown includes a pair of secondary yokes 16 and 18 having their inner ends 24 and outer ends 28 detachably connected to the support 10 and a bridge or primary yoke 20. The bridge has its ends detachably connected to intermediate portions of the secondary yokes, and a connector 22 is carried by the bridge for detachable connection of the entire assembly with a wiper arm.

The secondary yokes 16 and 18 are preferably identical in design and construction. The inner end 24 of each secondary yoke is formed to provide a transverse arcuate or curved medial base wall portion for rockable engagement with the upper part of the wiper element and is also provided with a pair of corresponding ears 26 disposed under the support for engagement therewith as evidenced in Figures 1 and 2. The outer end 28 of each secondary yoke is provided with a shroud-like end wall which serves to conceal the ends of the support. The outer end of each of the secondary yokes is also provided with a pair of ears 30 spaced inwardly from its end wall 28 for engagement with the underside of the support 10, and the base wall of the outer end of each of the secondary yokes may also rockably bear against the upper portion of the wiper element in a manner similar to the inner end 24. The pairs of ears 26 and 30 of the yoke 16 and the corresponding ears of the yoke 18 afford a sliding fit between these yokes and the laterally extending side portions of the support 10. The secondary yokes are preferably assembled with the support by merely sliding the yokes inwardly along the extremities of the support until the shroudlike end walls 28 of the yokes engage with the ends of the support 10 after which the respective ends of the bridge 20 are attached to the central portions of the secondary yokes in a manner which will be described more in detail subsequently. The central portion of each secondary yoke at the point of attachment and the end portions of the bridge member are formed to be concentric to each other when they are disposed in connected relation relative to each other. The just described overlying portions of the bridge and yokes have the shape of a segment of a torus such that the large radius or major axis of the torus lies coincident with the lengthwise dimension of the blade and the short radius or minor axis of the torus lies in a plane perpendicular to the lengthwise dimension of the blade.

As pointed out above, means are provided for detachably connecting the ends of the bridge to the secondary yokes which includes providing each end of the bridge with a pair of inturned corresponding fingers 32 best seen in Figures 1, 3 and 7, and the intermediate portion of each secondary yoke with a pair of generally L-shaped openings which receive the fingers. Each opening includes an entrance 34 leading to a slot 36, the latter extending in a direction from the entrance toward the center portion of a selected secondary yoke. It will be noted that each pair of opposed entrances 34 are disposed closer together than the slots 36 so that only the former will permit the fingers 32 on the primary yoke to pass into slot 36 when the fingers are first introduced into the L-shaped openings during the assembly operation.

Resilient means preferably in the form of a generally T-shaped spring 38, constituting a locking element, is secured to the underside of and within the confines of each secondary yoke by a rivet 40 or equivalent means. Each spring includes an inclined leg 42 through which the rivet extends, a pair of offset corresponding arms 44 and an offset finger or rest portion 46 which is somewhat shorter than the leg 42. The springs are of a size and length and so connected to the yokes that they are readily yieldable and positive in action. The arms 44 of each spring are preferably of a size whereby they may engage the inner surfaces of the side walls of a yoke for guidance so as to center the finger 46 for positive engagement with a fastener or button 48 movable in a hole 50 provided therefor in each secondary yoke. Each button is located substantially midway between an adjacent pair of entrances 34. Each fastener button preferably includes an inner concealed enlarged portion 52 which is caught between the underside of its secondary yoke and the finger 46 and an outer exposed portion 54 for manipulation as will be described more in detail subsequently.

As set forth above, one of the objects of the invention is to provide means for resiliently supporting the ends of the bridge on the secondary yokes for the purpose of reducing noise and urging the secondary yokes in a direction toward the blade assembly.

The subject matter described in this application is intended to improve on the device disclosed in the copending application of J. W. Anderson above referred to. In said copending application, it was contemplated to insert a comparatively thick rectangularly shaped spring element between the bridge and each secondary yoke, which spring was intended to be stiff enough to permit the ends of the bridge member to float vertically relative to the secondary yoke and to prevent rattling between said bridge and secondary yoke. It was found in manufacturing, however, that certain types of constructions did not have adequate clearance between the bridge member and secondary yoke to permit the inclusion of the spring contemplated by the above-mentioned copending application.

The instant invention uses a pair of relatively thin gauge spring members 60, one of which is adapted to be held on to each secondary yoke by means of the rivet 40 in such a position that the extended end portion 62 thereof is located in close proximity to the connected portions of the bridge 20 and the secondary yoke when they are arranged in assembled relation. The extended portion 62 of the spring 60 is considerably wider than the body portion or attached portion of said spring and has a laterally disposed rib 64 passing along the outer edge thereof which rib acts as a stiffening member for the spring. With the construction shown, the spring can be made of relatively thin gauge material such that relatively small tolerances will be required to fit it between the ends of bridge 20 and secondary yokes 16 and 18. It is intended that the fastening pin 40 and spring 60 could be attached to the bridge 20 and be disposed in the same relative position between the bridge 20 and secondary yoke without departing from the spirit of my invention.

To provide the necessary stiffness to the spring so as to resiliently support the bridge 20 relative to the secondary yoke and eliminate rattle therebetween, it is contemplated that the spring will be flexed in two perpendicularly disposed planes, that is, as viewed in Figure 3 the entrapped end portion of the spring will be bent so as to conform substantially to the curved outer periphery of the secondary yoke and simultaneously, as viewed in Figure 7, the spring will be deformed in a plane to conform substantially to the cross section of the secondary yoke therein illustrated. With the spring flexed as shown in Figures 3 and 7 it will assume the shape of a segment of a torus, a torus being defined as a geometrical shape that has a radius of one size in one plane and a radius of a different size in a plane perpendicular thereto. Due to the compound flexure of the spring in the two perpendicular planes, a high degree of resiliency is provided between the secondary yoke and the bridge, such as to provide the necessary floating action contemplated by this invention without using a thick piece of metal for the spring which would be stressed in only one dimension.

The rib 64 on the end of the spring 60 further serves to stiffen the spring in the plane of the minor axis of the torus, illustrated in Figure 7, the effect of this rib 64 being to add extra rigidity to the cross section of the spring so as to produce the same effective springing action as would be created by a much thicker and stiffer spring. When the bridge is assembled on the secondary yoke using the rib stiffened spring 60, the required clearance between the secondary yoke and overlying portion of the bridge is substantially reduced since it is possible to depress and deflect the thin spring 60 into a narrow space and still maintain a high degree of support between the yoke and bridge. The bridge in the assembled position will not only bow the spring in two perpendicular planes, but also will attempt to flatten out the rib 64, thus creating considerable supporting force between the yoke and bridge.

The above referred to supporting force will establish a relatively rigidly controlled rocking motion between the bridge and the yokes, about the crown of the yokes, so that as a wiper blade is oscillated across a windshield and its direction is reversed at the end of each stroke the blade will maintain a substantially rigid relationship relative to the bridge, but in the event some obstruction is encountered on the windshield the spring 60 will give under pressure and permit the blade to roll slightly relative to the bridge. In most cases, this slight roll will be sufficient to permit the blade to pass over the obstruction without damage to the over-all assembly.

The stiffness of the spring also maintains the bridge and yokes in spaced relation so that the fingers 32 on the bridge engage with the edges of the openings 34 in a fairly stiff manner. In this way the noise incident to the repeated contacting of the fingers with the edges of the opening 34 is eliminated since the fingers will be maintained almost continually in contact with said edges. The stiff spring prevents the bridge from contacting the yoke and holds the fingers on the bridge in rigid contact with the yoke so as to substantially eliminate noise between the parts.

In view of the foregoing, it will be apparent that the inner and outer ends of the secondary yokes are engageable with the longitudnally spaced ends of the wiper 12 and the laterally extending edges of support 10 for holding the yokes on the extremities of the support of the blade assembly when the ends of the bridge are attached to the secondary yokes.

The manner of attaching the pressure device to the blade assembly may be accomplished in different ways, but as exemplified in the drawing it is preferably accomplished by sliding or telescoping the two secondary yokes onto the extremities of the support of the blade assembly until the shrouded ends of the yokes engage the ends of the wiper 12 and support 10, after which one end of the bridge is attached to the secondary yoke 18, whereupon the blade assembly is bent to the bowed or abnormal position shown in Figure 2 so that the other end of the bridge can be connected to the other secondary yoke 16. If desired, the pressure device can also be attached to the blade assembly by sliding one secondary yoke on the blade assembly, then connecting one end of the bridge to the other secondary yoke and sliding the latter onto the blade assembly, after which the blade assembly is bowed so that the other end of the bridge can be attached to said one secondary yoke. After the pressure device is attached to the blade assembly by employing either of the aforesaid procedures or any other procedure, it is intended that the blade assembly will automatically return to a substantially straight condition or to a condition whereby the ends of the bridge are held connected with the secondary yokes.

More particularly, it will be noted by referring to Figure 1 that the longitudinal distance between the pairs of fingers 32 on the bridge is substantially equal to the longitudinal distance, between the pairs of slots 36, so that the fingers will be loosely disposed in the slots or float therein when the wiper is in the position shown in this figure or the blade assembly is in operative conforming relationship with a windshield. The longitudinal distance between the pairs of entrances 34 is somewhat greater, however, than the longitudinal distance between the slots so it is necessary to bend the blade assembly to reduce the distance between the entrances to substantially correspond with the distance between the fingers 32 in order that the last end of the bridge to be connected to a secondary yoke can be brought into a position whereby the fingers thereon can be manually directed into the entrances 34 therefor in advance of fingers 32 being received in the adjacent slots 36.

It will be noted that exposed portions 54 of the buttons are not only located between the respective pairs of entrances 34 but extend outwardly predetermined distances above the surface of the yokes which require depression of the buttons by the under surface of the ends of the bridge during assembly before the fingers can be received in the entrances. Thus, as viewed in Figure 2, the fingers on the free end of the bridge are received in the entrances 34 of the secondary yoke 16 after the end of the bridge is manually urged against the left button 48 to cause retraction of portion 54 thereof a sufficient distance to permit the fingers 32 to move into the slots 36 as the bridge end slides over the button, and when the fingers are substantially completely received in the slots 36 the bridge end will clear the inner edge of the button whereupon the button will snap outwardly due to the pressure exerted by end 46 of one of the springs 38. In other words, the successive entry of the fingers at the opposite ends of the bridge into the entrances and slots of the yokes is dependent on first depressing the buttons 48 to clear the fingers 32 into slots 36 and then the bridge and the integral fingers 32 are locked in place when the button springs out again.

Attention is directed to the fact that when the wiper is assembled as depicted in Figures 1 and 3, the fingers are movably disposed in the slots and that the fits are such that any relative longitudinal or rocking movements occurring between the ends of the bridge and secondary yokes is controlled and limited to a predetermined range in order to promote the most efficient operation of the wiper when it is oscillated across a windshield. It is to be especially noted that in accordance with the teaching of this invention the ends of the bridge in some measure float with respect to the secondary yokes since the ends are resiliently supported by the spring means 60 as alluded to above.

The pressure device is preferably readily disconnected from the blade assembly by merely pressing down on one of the buttons and then bending the blade assembly whereby that end of the bridge may be made to ride outwardly and over the depressed portion 54 of the button and simultaneously move the fingers 32 on the bridge end from the slots 36 into the entrances 34 to permit release of the fingers therethrough, after which the attached secondary yoke, bridge, and the separated secondary yoke are slid outwardly in opposite directions apart from the blade assembly in order that a new blade 12 and support 10 may be substituted when required.

It is to be noted that the spring 60 is covered by the bridge member 20 when the bridge 20 is assembled on one of the yokes 16 or 18. It is believed to be obvious that the spring 60 could be fastened to the yoke on the other side of the button 48 with an aperture through the spring to permit the button to project therethrough such that the end of the spring containing the rib 64 would be disposed between the bridge 20 and yoke 16 or 18 whereby, when assembled, the spring 60 would serve the same purpose above described.

Having thus described my invention, it is obvious that various modifications may be made in the same without departing from the spirit of the invention; and, therefore, I do not wish to be understood as limiting myself to the exact form, construction, arrangement and combination of parts herein shown and described.

I claim:

1. A windshield wiper blade and a pressure device therefor, said pressure device comprising a pair of yokes mounted on the blade and being arcuately curved in the mid-portions thereof, a bridge having arcuately curved end portions detachably connected to said yokes, and resilient support means interposed between the arcuately curved end portions of the bridge and the arcuately curved mid-portions of the yokes comprising an elongate, substantially flat spring member fastened to the upper portion of the yoke and cooperating with the arcuately curved portions of the bridge and the yoke, said spring member being deformed by said arcuately curved portions in a pair of perpendicular planes to provide resilient support between the bridge and the yokes.

2. In a windshield wiper having a flexible blade, a pair of secondary yokes arcuately curved in cross section engaging the opposite end portions of said blade, and a primary yoke having opposite ends arcuately curved in cross section and engaging with the middle portions of said secondary yokes, the combination of means for resiliently supporting said primary yoke relative to each secondary yoke, one of said means comprising an elongate resilient member carried by one of said yokes in a position to be engaged between the arcuately curved portion of said primary and one of said arcuately curved secondary yokes, said member being flexed between said arcuately curved primary and said arcuately curved secondary yoke along two planes perpendicular to each other for supporting the primary and secondary yokes relative to each other.

3. In a windshield wiper the combination of a flexible blade, at least one secondary yoke removably attached to one end portion of the blade, a bridge member having one end portion loosely attached to the mid-portion of said yoke, the mid-portion of said yoke and the overlying end portion of said bridge being substantially concentrically disposed relative to each other, and means disposed between said concentric portions for resiliently supporting said bridge relative to said secondary yoke, said means comprising a broad elongate resilient spring element attached to said yoke and lying between the bridge member and yoke in close proximity to the attached portions thereof, the spring element being flexed in two perpendicular planes by the overlying concentric portions of the bridge member and yoke.

4. A windshield wiper having a flexible blade, at least one secondary yoke arcuately curved in cross section and engaging one end portion of said blade, a primary yoke arcuately curved in cross section near the end portions and adapted to engage the mating arcuately curved middle portion of said secondary yoke, means for resiliently supporting said primary yoke relative to said secondary yoke, said means comprising a broad, flat, generally planar spring member fastened to one of said yokes in a position to be engaged between said mating arcuately curved primary and secondary yokes, and coacting means on said primary and secondary yokes for attaching said yokes together and deflecting said spring therebetween along two planes perpendicular to each other for supporting one yoke relative to the other.

5. In a windshield wiper the combination of a flexible blade, at least one secondary yoke removably attached to one end portion of the blade, a bridge member having one end portion loosely attached to the mid-portion of said yoke, the other end portion of the bridge member being carried by said blade, the mid-portion of said yoke and the overlying end portion of said bridge member being concentric to each other and having the shape of a segment of a torus, and means disposed between said concentric portions for resiliently supporting said bridge relative to said secondary yoke, said means comprising an elongated resilient spring element attached to said yoke and lying between the bridge member and yoke in close proximity to the attached portions thereof, said spring element being flexed along both the major and the minor axis of the torus whereby the bridge is resiliently supported relative to the yoke.

6. A subassembly for use with a windshield wiper blade, said subassembly comprising a pair of pressure members, means providing a connection between the members affording relative movement between the members, and a resiliently flexible element constructed of sheet material interposed between the members adjacent the connection, said element having a portion engaging one of the members and other portions spaced from one another engaging the other member serving to stabilize the relative movement and resiliently support one of the members with respect to the other.

7. A subassembly for use with a windshield wiper blade, said subassembly comprising a pair of pressure members, means providing a connection between the members affording relative movement between the members, and a resiliently flexible element constructed of sheet material interposed between the members adjacent the connection, said element having a central portion engaging one of the members and side portions spaced from one another and the central portion engaging the other member and serving to stabilize the relative movement and resiliently support one of the members with respect to the other.

8. A subassembly for use with a windshield wiper blade, said subassembly comprising a pair of elongate pressure members, one of said members being provided with receiving means and the other member with means projecting into the receiving means to afford relative movement therebetween, a latch carried by the subassembly for detaining the projecting means in the receiving means, and a resiliently flexible element constructed from sheet material interposed between the members, said element having three portions, one of which portions engages one of the members and the others engage the other member in a manner whereby to resiliently support one member with respect to the other member.

9. A subassembly for use with a windshield wiper blade, said subassembly comprising a pair of elongate pressure members, one of said members being provided with receiving means and the other member with means projecting into the receiving means to afford relative movement therebetween, a latch carried by the subassembly for detaining the projecting means in the receiving means, and a resiliently flexible element constructed from sheet material secured between the members to flex the element in a direction generally transverse to the length of the members so that different portions of the element will engage the members in a manner whereby to stabilize the relative movement and urge the members apart.

10. In combination: a windshield wiper blade, a pressure device comprising a plurality of relatively movable members operatively connected with one another and the wiper blade, one of said movable members having entering means and another of the members being provided with means receiving the entering means to establish a connection therebetween, and an elongate leaf spring secured between said members having a central portion engaging one of the members and side portions engaging the other member assisting to stabilize the relationship of the members and urge them apart.

11. In combination: a windshield wiper blade, a pressure device comprising a pair of pressure members operatively connected to the blade, a bridge having ends respectively rockably connected to the members, and a resiliently flexible element constructed of sheet material secured in a transversely flexed condition between one of the pressure members and one of the ends of the bridge.

12. In combination: a windshield wiper blade, a pressure device comprising a pair of pressure members operatively connected to the blade, a bridge having one end connected to one of the members, means including a latch for rockably and detachably connecting the opposite end of the bridge to the other pressure member, and a resiliently flexible element constructed of sheet material secured in a transversely flexed condition between one of the pressure members and one of the ends of the bridge for resiliently supporting this end of the bridge.

References Cited in the file of this patent

UNITED STATES PATENTS

| | | |
|---|---|---|
| 2,667,656 | Oishei | Feb. 2, 1954 |
| 2,741,792 | Ehrlich et al. | Apr. 17, 1956 |
| 2,782,445 | Krohm | Feb. 26, 1957 |
| 2,807,521 | Scinta | Oct. 1, 1957 |

FOREIGN PATENTS

| | | |
|---|---|---|
| 1,033,521 | France | Apr. 1, 1953 |